(12) United States Patent
Dossous

(10) Patent No.: US 12,434,373 B2
(45) Date of Patent: Oct. 7, 2025

(54) PIPE HOLDING ASSEMBLY

(71) Applicant: Garry Dossous, Pomona, NY (US)

(72) Inventor: Garry Dossous, Pomona, NY (US)

( * ) Notice: Subject to any disclaimer, the term of this patent is extended or adjusted under 35 U.S.C. 154(b) by 355 days.

(21) Appl. No.: 18/123,288

(22) Filed: Mar. 19, 2023

(65) Prior Publication Data

US 2024/0309971 A1   Sep. 19, 2024

(51) Int. Cl.
  *B25H 1/08*   (2006.01)
  *B25B 5/14*   (2006.01)
  *F16L 3/02*   (2006.01)

(52) U.S. Cl.
  CPC ............... *B25H 1/08* (2013.01); *B25B 5/147* (2013.01); *F16L 3/02* (2013.01)

(58) Field of Classification Search
  CPC .. B25B 5/147; B25H 1/00; B25H 1/02; B25H 1/04; B25H 1/08
  See application file for complete search history.

(56) References Cited

U.S. PATENT DOCUMENTS

| | | |
|---|---|---|
| 2,316,432 A | 4/1943 | Von Hott |
| 2,532,168 A | 11/1950 | Jakoubek |
| 4,221,363 A | 9/1980 | Jasper |
| 4,445,656 A * | 5/1984 | Leitch .................... F16L 3/1058 24/23 R |
| 6,142,699 A * | 11/2000 | Pao ........................ F16B 7/1454 403/109.5 |
| 6,206,613 B1* | 3/2001 | Elkins ....................... F16L 3/26 405/172 |
| 6,467,741 B1 | 10/2002 | Shih |
| D907,880 S | 1/2021 | Fox |
| 2002/0011548 A1* | 1/2002 | Parker ....................... F16L 3/11 248/354.3 |
| 2012/0168570 A1* | 7/2012 | Smith ....................... F16L 3/00 248/65 |
| 2019/0256332 A1 | 8/2019 | Fox |
| 2020/0048056 A1 | 2/2020 | Bush |

FOREIGN PATENT DOCUMENTS

WO   WO2018160938   9/2018

\* cited by examiner

*Primary Examiner* — Tyrone V Hall, Jr.

(57) ABSTRACT

A pipe holding assembly includes a base and a screw extending upwardly from the base. A clamping unit is threadably attachable to the screw and the clamping unit is adjustable upwardly and downwardly on the screw. An extension pipe is insertable into the clamping unit such that the extension pipe is vertically oriented when the base is positioned on the support surface. Additionally, the extension pipe includes a coupling element. A cradle is movably attachable to a coupling element of the extension pipe such that the cradle has an adjustable height with respect to the extension pipe. In this way the cradle can be positioned to support a pipe.

10 Claims, 9 Drawing Sheets

PIPE HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pipe holding devices and more particularly pertains to a new pipe holding device for supporting a pipe in a horizontal orientation to facilitate service work to be performed on the pipe. The device includes a base, a clamping unit being attachable to the base, an extension pipe attachable to the clamping unit and a cradle attachable to the extension pipe. The clamping unit has an adjustable height on the base and the cradle has an adjustable height on the extension pipe. In this way the cradle can support a pipe to perform service work on the pipe.

(2) Description of Related Art Including Information Disclosed Under 37 CFR 1.97 and 1.98

The prior art relates to pipe holding devices including a lifting jack that has a foot pedal and a cradle threadably attached to the lifting jack. The prior art discloses a roof and timber jack that includes a sleeve, a screw threadably engaging the sleeve, a cradle pivotally attached to the screw and a foot pivotally attached to the sleeve. The prior art discloses a mine jack that has an adjustment screw that is operable in a first mode for rapid linear advancement and a second mode for slow rotational advancement. The prior art discloses a variety of lifting jacks that each at least includes a sleeve, turnbuckle rotatably disposed on the sleeve and a screw that threadably engages the turnbuckle such that the screw can be raised or lowered in the turnbuckle.

BRIEF SUMMARY OF THE INVENTION

An embodiment of the disclosure meets the needs presented above by generally comprising a base and a screw extending upwardly from the base. A clamping unit is threadably attachable to the screw and the clamping unit is adjustable upwardly and downwardly on the screw. An extension pipe is insertable into the clamping unit such that the extension pipe is vertically oriented when the base is positioned on the support surface. Additionally, the extension pipe includes a coupling element. A cradle is movably attachable to a coupling element of the extension pipe such that the cradle has an adjustable height with respect to the extension pipe. In this way the cradle can be positioned to support a pipe.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
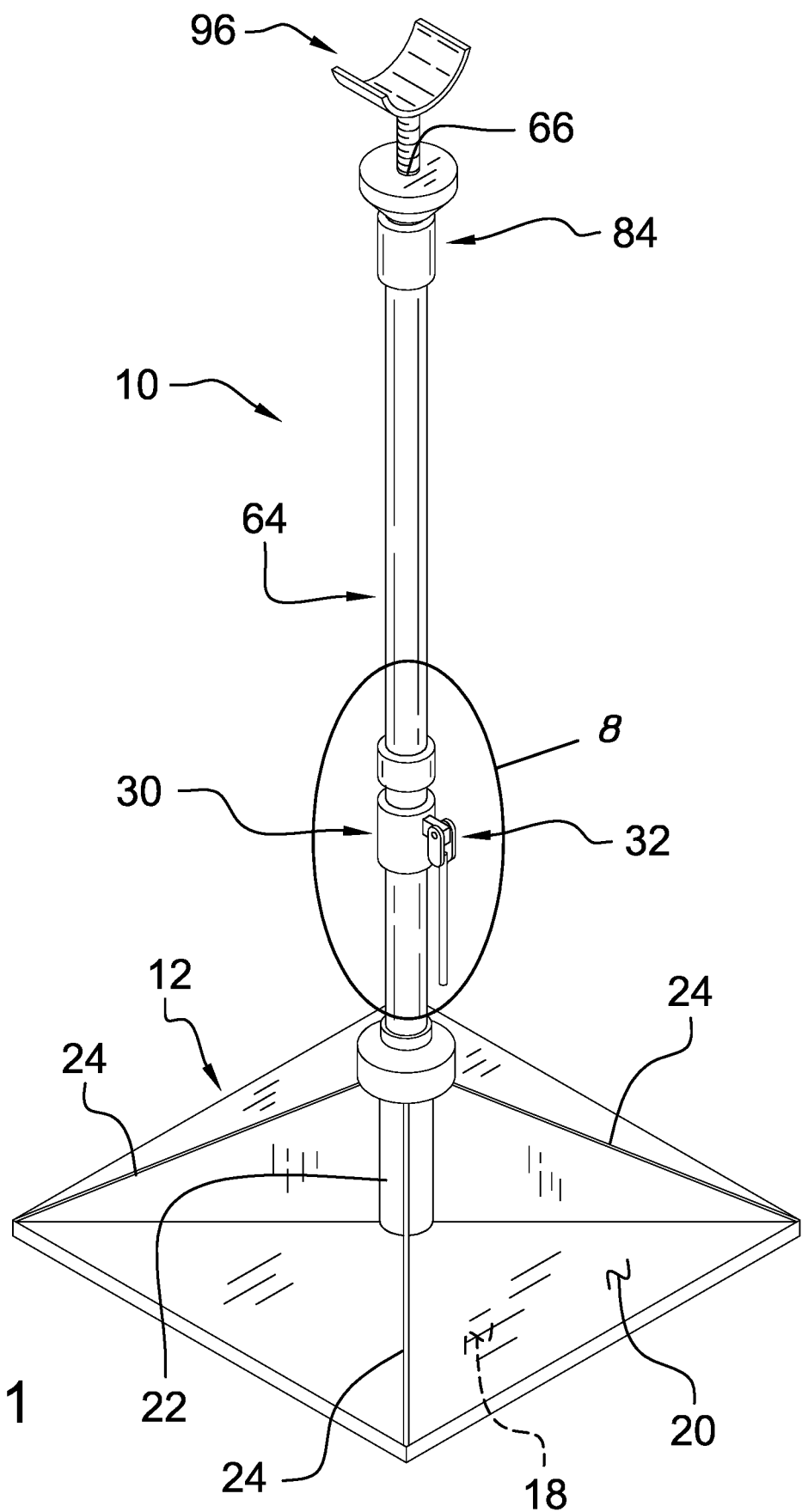
FIG. 1 is a front perspective view of a pipe holding assembly according to an embodiment of the disclosure.
Figure 2:
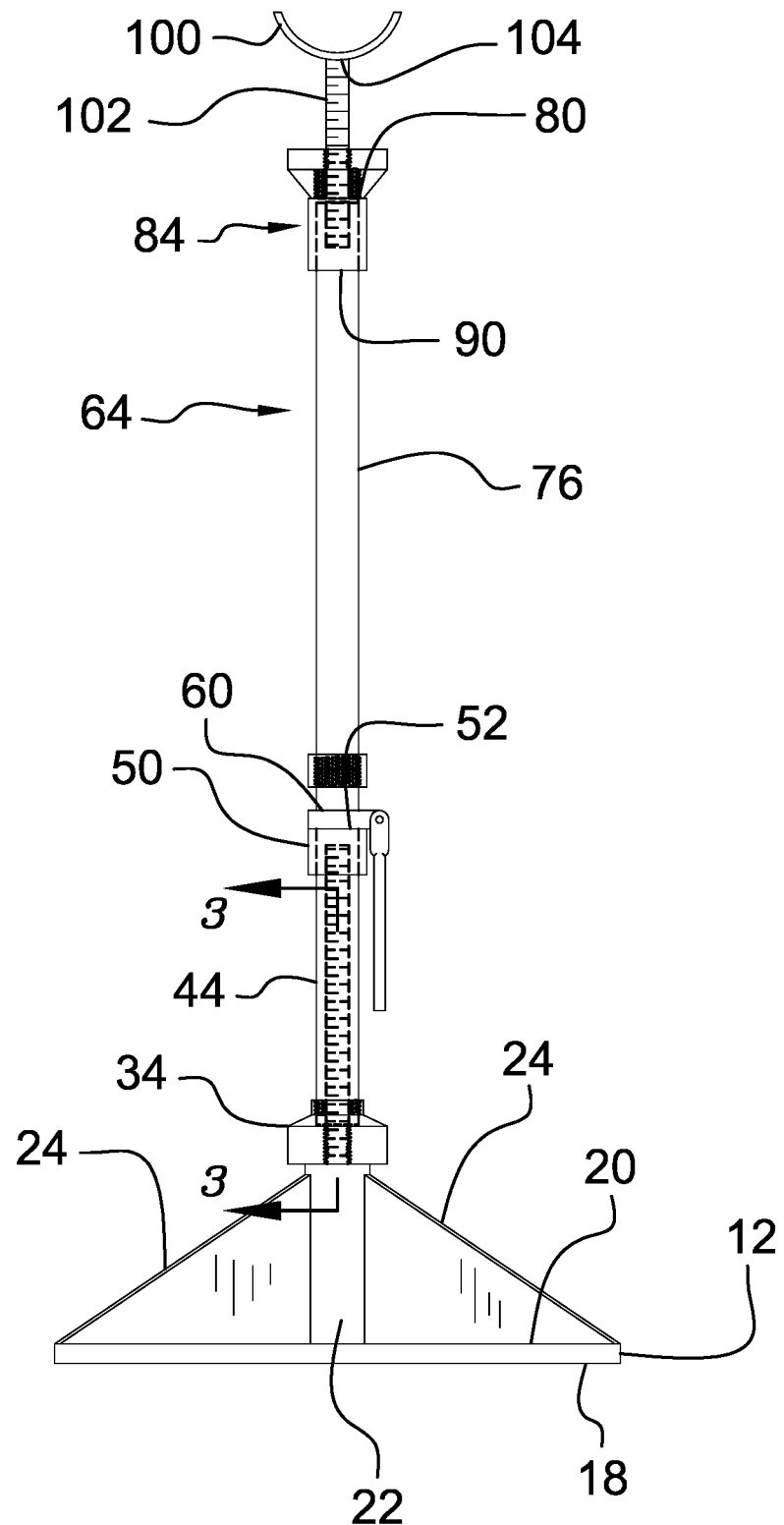
FIG. 2 is a front view of an embodiment of the disclosure.
Figure 3:
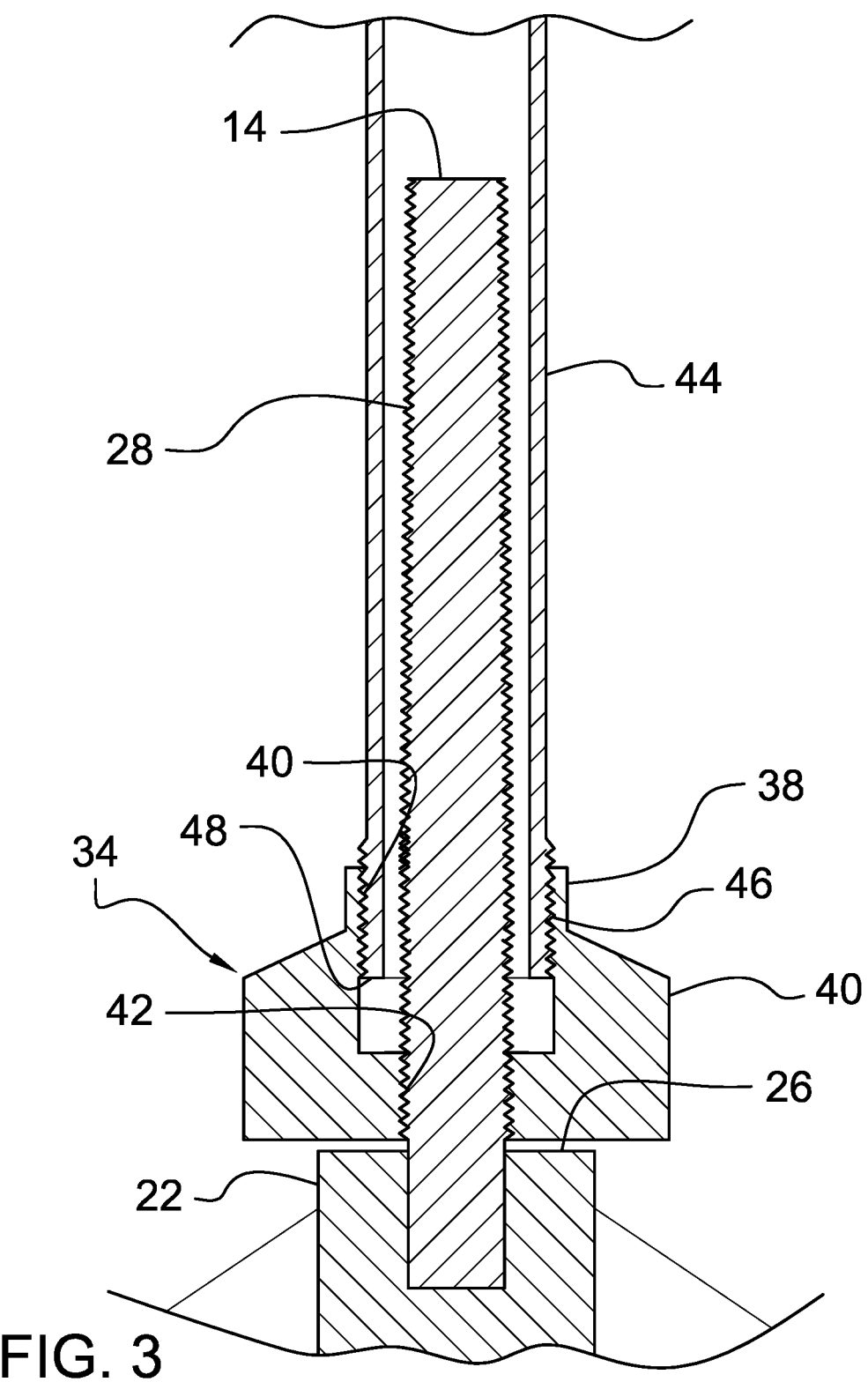
FIG. 3 is a cross sectional view taken along line 3-3 of FIG. 2 of an embodiment of the disclosure.
Figure 4:
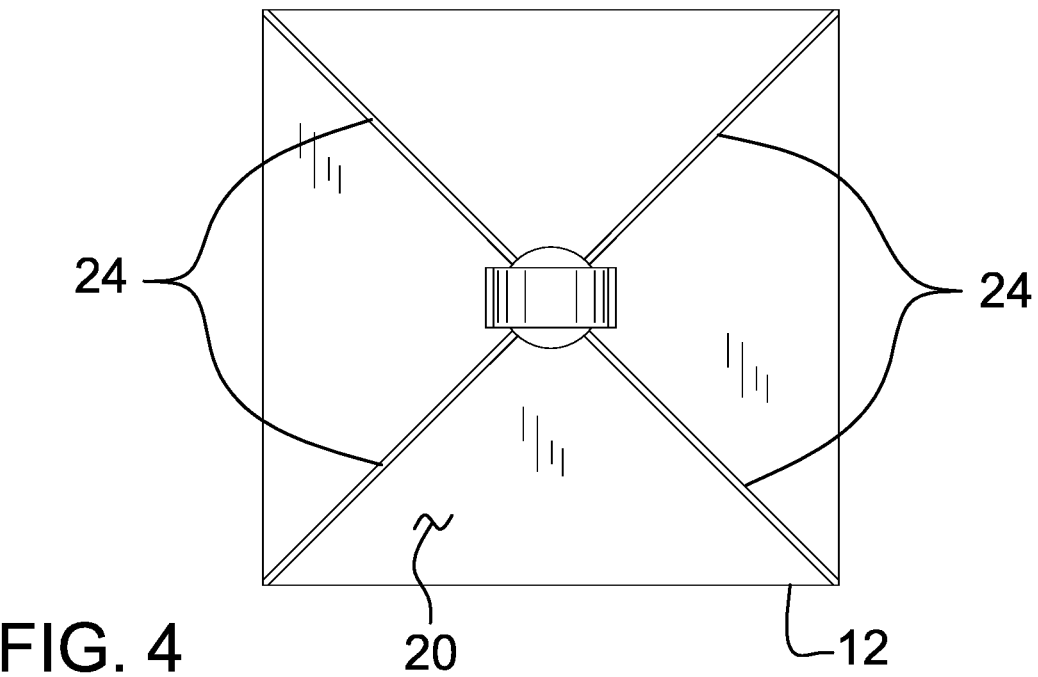
FIG. 4 is a top view of an embodiment of the disclosure.
Figure 5:
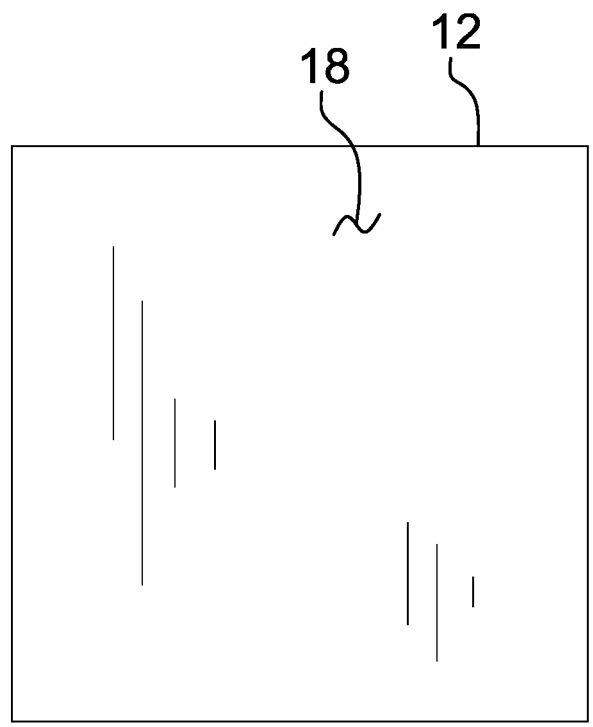
FIG. 5 is a bottom view of an embodiment of the disclosure.
Figure 6:
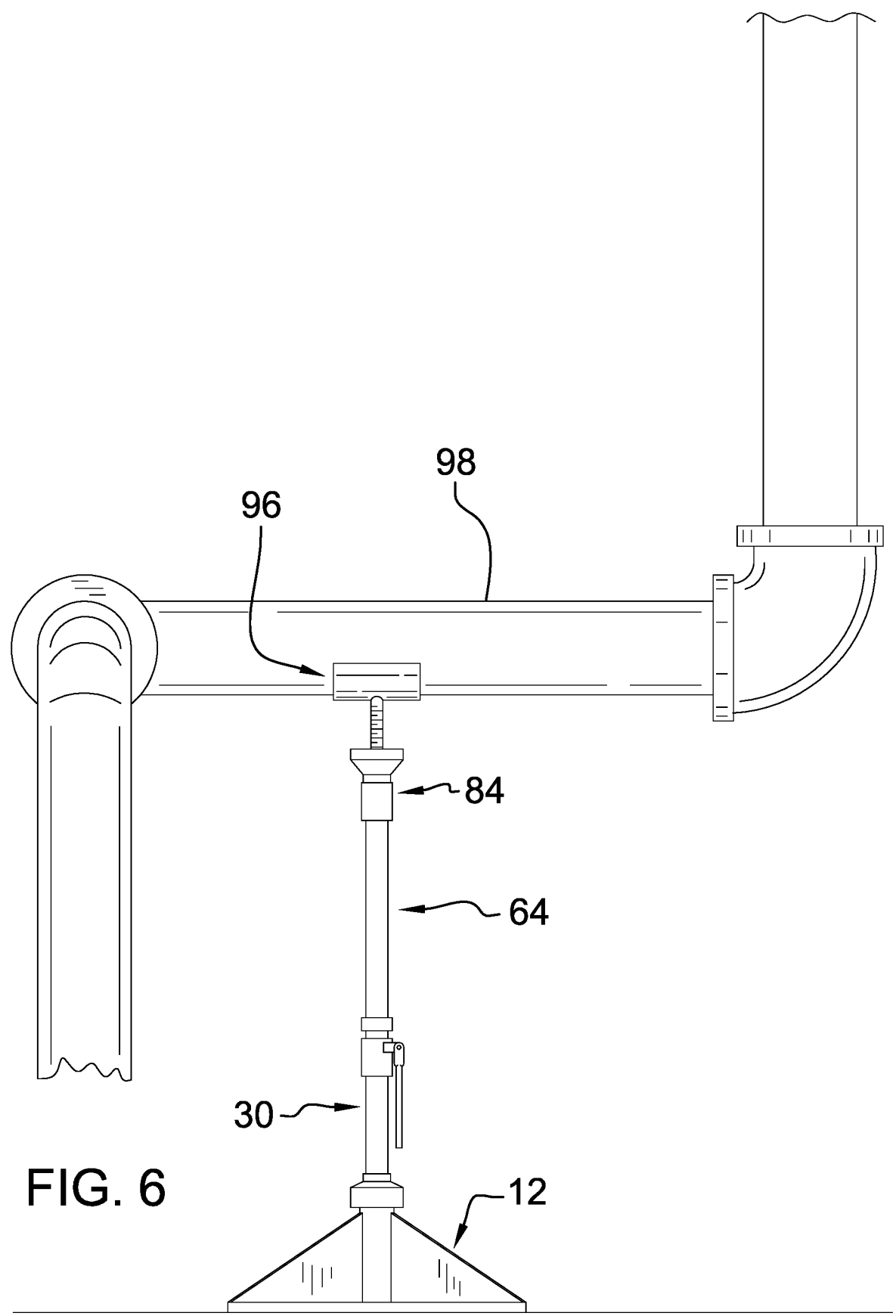
FIG. 6 is a perspective in-use view of an embodiment of the disclosure.
Figure 7:
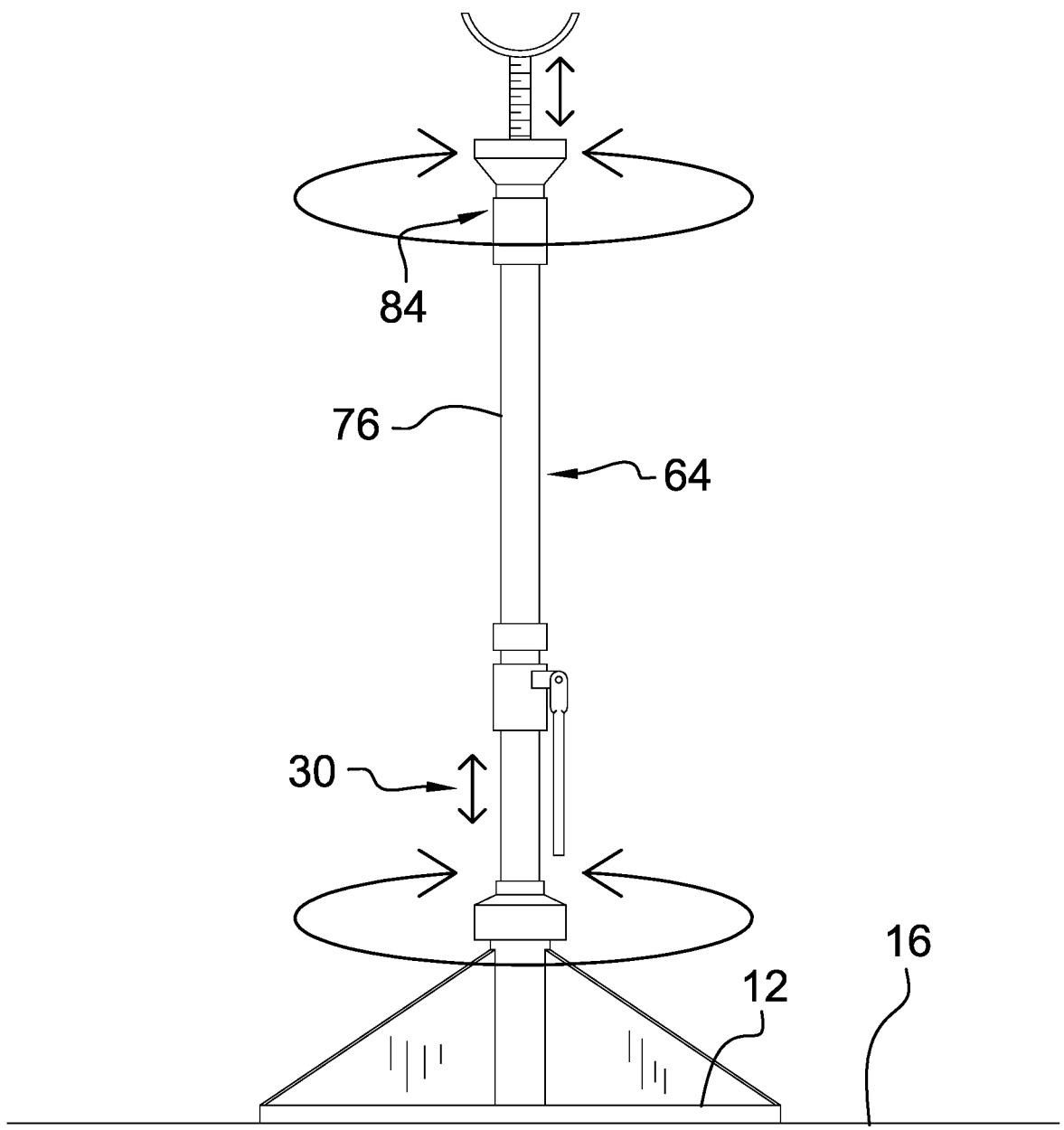
FIG. 7 is a perspective in-use view of an embodiment of the disclosure showing a clamping unit being adjusted on a base and showing a cradle being adjusted on an extension pipe.
Figure 8:
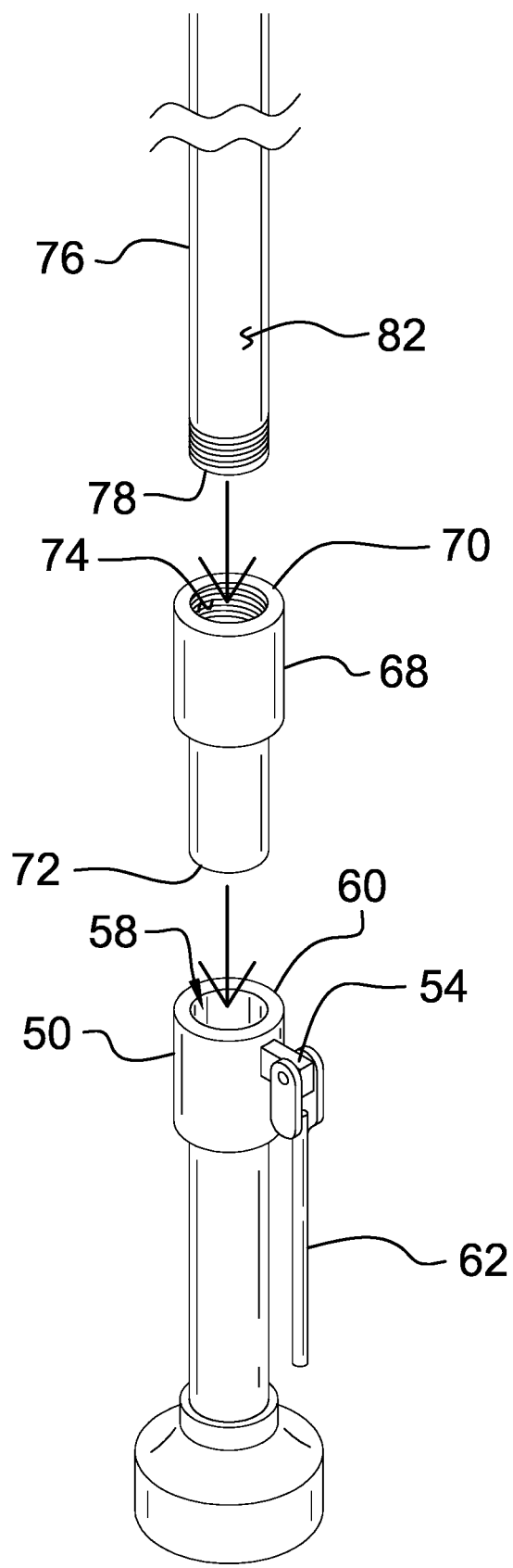
FIG. 8 is an exploded detail view taken from circle 8 of FIG. 1 of an embodiment of the disclosure.
Figure 9:
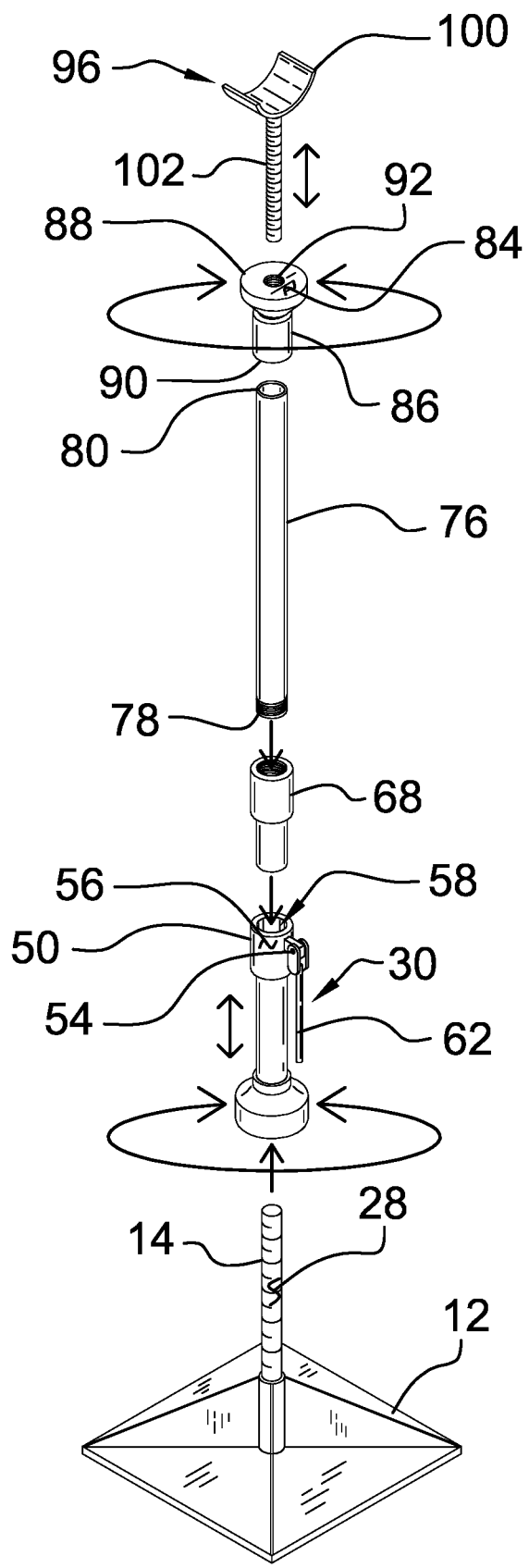
FIG. 9 is an exploded view of an embodiment of the disclosure.
Figure 10:
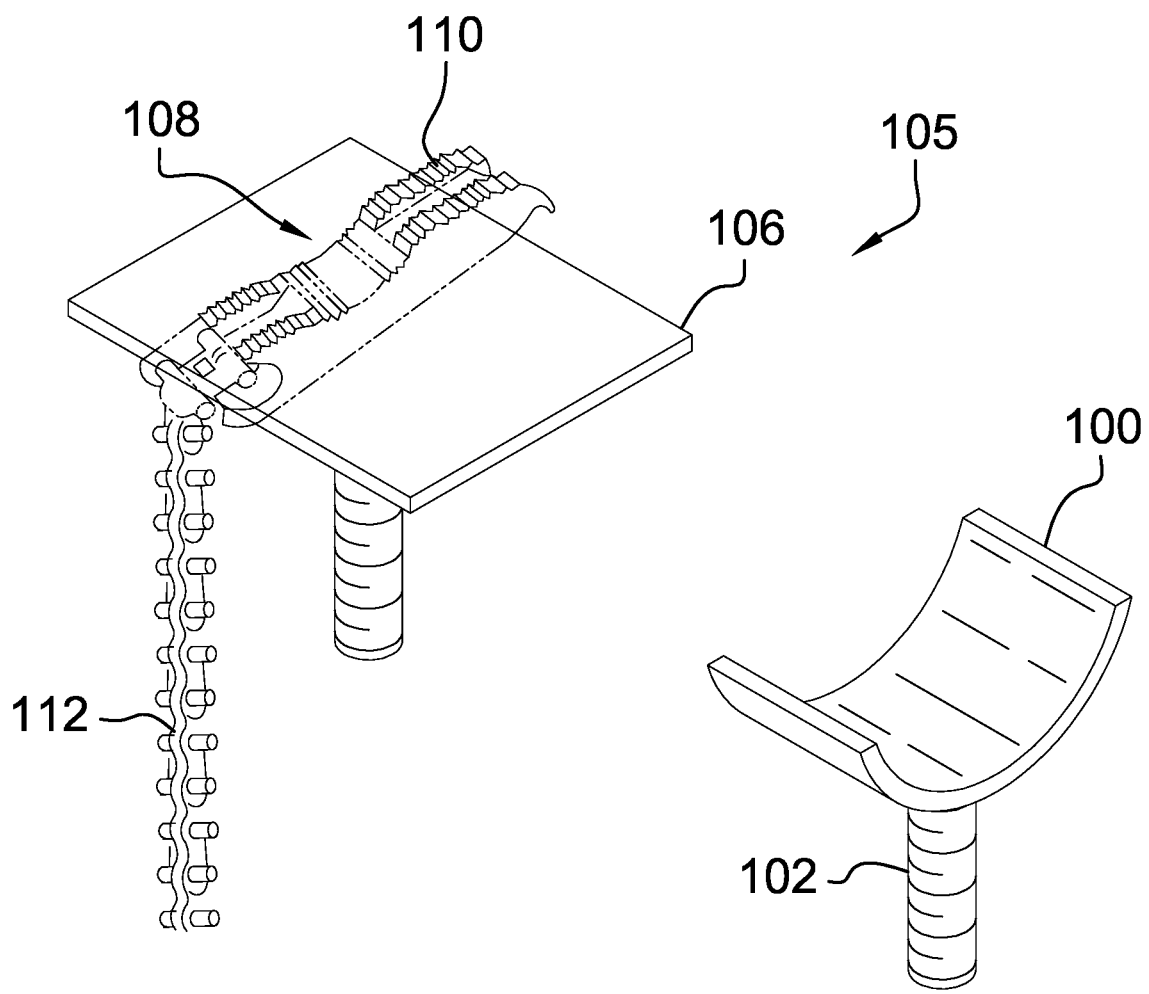
FIG. 10 is a perspective view of an alternative embodiment of the disclosure.

With reference now to the drawings, and in particular to FIGS. 1 through 10 thereof, a new pipe holding device embodying the principles and concepts of an embodiment of the disclosure and generally designated by the reference numeral 10 will be described.

As best illustrated in FIGS. 1 through 6, the pipe holding assembly 10 generally comprises As best illustrated in FIGS. 1 through 6, the pipe holding assembly 10 generally comprises a base 12 that has a screw 14 extending upwardly from the base 12 such that the screw 14 is vertically oriented when the base 12 is positioned on a support surface 16. The support surface 16 may be a floor, the ground or any other horizontal support surface 16. The base 12 has a bottom surface 18, a top surface 20 and a cylinder 22 extending upwardly from the top surface 20 and the cylinder 22 is centrally located on the top surface 20. The base 12 has a plurality of gussets 24 each extending between the cylinder 22 and the top surface 20 for retaining the cylinder 22 in a perpendicular orientation with the top surface 20. The screw 14 is attached to and extends away from a distal end 26 of the cylinder 22 and an outer surface 28 of the screw 14 is threaded. The cylinder 22 may have a length ranging between approximately 15.0 cm and 20.0 cm.

A clamping unit 30 is threadably attachable to the screw 14 such that the clamping unit 30 is vertically oriented when the base 12 is positioned on the support surface 16. The clamping unit 30 is adjustable upwardly and downwardly on the screw 14. Additionally, the clamping unit 30 including a latch 32 that is urgeable between a tightening condition and a loosening condition. The clamping unit 30 comprises a collar 34 that has a skirt 36 and a throat 38; a bounding surface 40 of the throat 38 is threaded and a bounding surface 42 of the skirt 36 is threaded. The bounding surface 42 of the skirt 36 defines a diameter that is less than a diameter defined by the bounding surface 40 of the throat 38. The outer surface 28 of the screw 14 threadably engages the bounding surface 42 of the skirt 36 and the collar 34 is adjustable along a full length of the screw 14.

The clamping unit 30 includes a pipe 44 that has an outside surface 46 which is threaded adjacent to a first end 48 of the pipe 44. The first end 48 is insertable into the throat 38 of the collar 34 having the outside surface 46 threadably engaging the bounding surface 40 of the throat 38 and having the screw 14 extending upwardly into the pipe 44. The clamping unit 30 includes a receiver 50 that is disposed on a second end 52 of the pipe 44 and the receiver 50 has a pivot point 54 integrated into an exterior surface 56 of the receiver 50. The receiver 50 has a well 58 extending into a distal end 60 of the receiver 50 with respect to the second end 52 of the pipe 44 and the pivot point 54 is positioned adjacent to the distal end 60 of the receiver 50.

The clamping unit 30 includes a handle 62 that has a coupled end is pivotally coupled to the pivot point 54 on the exterior surface 56 of the receiver 50. The handle 62 is compressed against the receiver 50 when the handle 62 is lifted in the pivot point 54 thereby reducing the diameter of the well 58 in the distal end 60 of the receiver 50. Conversely, the handle 62 is decompressed from the receiver 50 when the handle 62 is lowered in the pivot point 54 thereby increasing the diameter of the well 58 in the distal end 60 of the receiver 50. The collar 34, the pipe 44 and the receiver 50 may have a combined length ranging between approximately 15.0 cm and 20.0 cm.

An extension pipe 64 is provided that is insertable into the clamping unit 30 such that the extension pipe 64 is vertically oriented when the base 12 is positioned on the support surface 16. The extension pipe 64 is secured in the clamping unit 30 when the latch 32 is urged into the tightening condition. Conversely, the extension pipe 64 is unsecured in the clamping unit 30 when the latch 32 is urged into the loosening condition. Additionally, the extension pipe 64 has a coupling element 66 and the extension pipe 64 may have a total length ranging between approximately 60.0 cm and 90.0 cm.

The extension pipe 64 comprises a reducer 68 that has an upper end 70 and a lower end 72. The upper end 70 has a diameter that is greater than a diameter of the lower end 72 and reducer 68 has an elongated annular shape. An interior surface 74 of the reducer 68 is threaded adjacent to the upper end 70 and the lower end 72 is insertable into the well 58 in the distal end 60 of the receiver 50. The receiver 50 tightens around the reducer 68 when the handle 62 is lifted thereby inhibiting the reducer 68 from being removed from the receiver 50. Conversely, the receiver 50 loosens around the reducer 68 when the handle 62 is lowered thereby facilitating the reducer 68 to be removed from the receiver 50.

The extension pipe 64 includes a tube 76 that has a bottom end 78, a top end 80 and an exterior surface 82 extending between the bottom end 78 and the top end 80 and the exterior surface 82 is threaded adjacent to the bottom end 78. The exterior surface 82 threadably engages the interior surface 74 of the reducer 68 when the bottom end 78 is inserted into the upper end 70 of the reducer 68. The extension pipe 64 includes a top mount 84 which has a sleeve 86 and a platform 88 lying on a plane that is perpendicularly oriented with a longitudinal axis of the sleeve 86. The sleeve 86 has a lower end 90 that is open and the lower end 90 of the sleeve 86 insertably receives the top end 80 of the tube 76. The platform 88 has a well 92 extending downwardly into the platform 88, the well 92 in the platform 88 is centrally located on the platform 88 and the well 92 in the platform 88 has a bounding surface 94 which is threaded.

A cradle 96 is movably attachable to the coupling element 66 of the extension pipe 64 such that the cradle 96 has an adjustable height with respect to the extension pipe 64. In this way the cradle 96 can be positioned to support a pipe 98. The pipe 98 may be a plumbing pipe, a steel pipe for delivering oil or any other type of pipe which has a weight that would be challenging for the average person to hold. The cradle 96 includes a half pipe 100 and a screw 102 extending downwardly from the half pipe 100 and the screw 102 on the half pipe 100 is aligned with an apex 104 of the half pipe 100. The screw 102 on the half pipe 100 threadably engages the bounding surface 94 of the well 92 in the platform 88 thereby facilitating the half pipe 100 to be spaced an adjustable distance over the platform 88. In this way the half pipe 100 can conform to the pipe 44 thereby retaining the pipe 44 at a desired height. The screw 14 on the half pipe 100 may have a length ranging between approximately 10.0 cm and 25.0 cm and the half pipe 100 may have a diameter ranging between approximately 15.0 cm and 25.0 cm. In an alternative embodiment 105 shown in FIG. 10, the cradle 96 may include a plate 106 and a chain retainer 108 attached to the plate 106. The chain retainer 108 may include a toothed grip 110 and a chain 112 attached to the toothed grip 110. The chain 112 can be placed over the pipe 44 and engage the toothed grip 110 to secure the pipe 44 to the plate 106.

In use, the base 12 is positioned beneath the pipe 44 that is to be supported and the collar 34 is rotated on the screw 14 on the base 12 to adjust the height of the clamping unit 30. The lower end 72 of the reducer 68 is inserted into the receiver 50 of the clamping unit 30 and the handle 62 is lifted to secure the reducer 68 in the receiver 50. The screw 102 on the half pipe 100 is threaded in the well 92 in the platform 88 and the screw 102 on the half pipe 100 is rotated to either raise or lower the half pipe 100 to support the pipe 44 at a desired height. In this way the pipe 44 can be supported in a horizontal orientation at a desired height to facilitate service work to be performed on the pipe 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pipe holding assembly for precisely locating a pipe for performing joining procedures on the pipe, said assembly comprising:
    a base having a screw extending upwardly from said base such that said screw is vertically oriented when said base is positioned on a support surface;
    a clamping unit being threadably attachable to said screw such that said clamping unit is vertically oriented when said base is positioned on the support surface, said clamping unit being adjustable upwardly and downwardly on said screw, said clamping unit including a latch being urgeable between a tightening condition and a loosening condition;
    an extension pipe being insertable into said clamping unit such that said extension pipe is vertically oriented when said base is positioned on the support surface, said extension pipe being secured in said clamping unit when said latch is urged into said tightening condition, said extension pipe being unsecured in said clamping unit when said latch is urged into said loosening condition, said extension pipe having a coupling element;
    a cradle being movably attachable to said coupling element of said extension pipe such that said cradle has an adjustable height with respect to said extension pipe wherein said cradle is configured to be positioned to support a pipe; and
    wherein said extension pipe includes:
        a reducer having an upper end and a lower end, said upper end having a diameter being greater than a diameter of said lower end, reducer having an elongated annular shape, an interior surface of said reducer being threaded adjacent to said upper end; and
        a tube having a bottom end, a top end and an exterior surface extending between said bottom end and said top end, said exterior surface being threaded adjacent to said bottom end, said exterior surface threadably engaging said interior surface of said reducer when said bottom end is inserted into said upper end of said reducer.

2. The assembly according to claim 1, wherein;
    said base has a bottom surface, a top surface and a cylinder extending upwardly from said top surface, said cylinder being centrally located on said top surface;
    said base has a plurality of gussets each extending between said cylinder and said top surface for retaining said cylinder in a perpendicular orientation with said top surface; and
    said screw is attached to and extends away from a distal end of said cylinder, an outer surface of said screw being threaded.

3. The assembly according to claim 2, wherein said clamping unit comprises a collar having a skirt and a throat, a bounding surface of said throat being threaded, a bounding surface of said skirt being threaded, said bounding surface of said skirt defining a diameter being less than a diameter defined by said bounding surface of said throat, said outer surface of said screw threadably engaging said bounding surface of said skirt, said collar being adjustable along a full length of said screw.

4. The assembly according to claim 3, wherein said clamping unit includes a pipe having an outside surface being threaded adjacent to a first end of said pipe, said first end being insertable into said throat of said collar having said outside surface threadably engaging said bounding surface of said throat having said screw extending upwardly into said pipe.

5. The assembly according to claim 4, wherein said clamping unit includes a receiver being disposed on a second end of said pipe, said receiver having a pivot point integrated into an exterior surface of said receiver, said receiver having a well extending into a distal end of said receiver with respect to said second end of said pipe, said pivot point being positioned adjacent to said distal end of said receiver.

6. The assembly according to claim 5, wherein said clamping unit includes a handle having a coupled end being pivotally coupled to said pivot point on said exterior surface of said receiver, said handle being compressed against said receiver when said handle is lifted in said pivot point thereby reducing the diameter of said well in said distal end of said receiver, said handle being decompressed from said receiver when said handle is lowered in said pivot point thereby increasing the diameter of said well in said distal end of said receiver.

7. The assembly according to claim 1, wherein said extension pipe includes a top mount having a sleeve and a platform lying on a plane being perpendicularly oriented with a longitudinal axis of said sleeve, said sleeve having a lower end being open, said lower end of said sleeve insertably receiving said top end of said tube, said platform having a well extending downwardly into said platform such that said well in said platform defines said coupling element of said extension pipe, said well in said platform being centrally located on said platform, said well having a bounding surface being threaded.

8. The assembly according to claim 7, further comprising said cradle including a half pipe and a screw extending downwardly from said half pipe, said screw on said half pipe being aligned with an apex of said half pipe, said screw on said half pipe threadably engaging said bounding surface of said well in said platform thereby facilitating said half pipe to be spaced an adjustable distance over said platform wherein said half pipe is configured to conform to the pipe thereby retaining the pipe at a desired height.

9. A pipe holding assembly for precisely locating a pipe for performing joining procedures on the pipe, said assembly comprising:
    a base having a screw extending upwardly from said base such that said screw is vertically oriented when said base is positioned on a support surface;

a clamping unit being threadably attachable to said screw such that said clamping unit is vertically oriented when said base is positioned on the support surface, said clamping unit being adjustable upwardly and downwardly on said screw, said clamping unit including a latch being urgeable between a tightening condition and a loosening condition;

an extension pipe being insertable into said clamping unit such that said extension pipe is vertically oriented when said base is positioned on the support surface, said extension pipe being secured in said clamping unit when said latch is urged into said tightening condition, said extension pipe being unsecured in said clamping unit when said latch is urged into said loosening condition, said extension pipe having a coupling element; and a cradle being movably attachable to said coupling element of said extension pipe such that said cradle has an adjustable height with respect to said extension pipe wherein said cradle is configured to be positioned to support a pipe;

wherein said base has a bottom surface, a top surface and a cylinder extending upwardly from said top surface, said cylinder being centrally located on said top surface;

wherein said base has a plurality of gussets each extending between said cylinder and said top surface for retaining said cylinder in a perpendicular orientation with said top surface;

wherein said screw is attached to and extends away from a distal end of said cylinder, an outer surface of said screw being threaded;

wherein said clamping unit comprises a collar having a skirt and a throat, a bounding surface of said throat being threaded, a bounding surface of said skirt being threaded, said bounding surface of said skirt defining a diameter being less than a diameter defined by said bounding surface of said throat, said outer surface of said screw threadably engaging said bounding surface of said skirt, said collar being adjustable along a full length of said screw;

wherein said clamping unit includes a pipe having an outside surface being threaded adjacent to a first end of said pipe, said first end being insertable into said throat of said collar having said outside surface threadably engaging said bounding surface of said throat having said screw extending upwardly into said pipe;

wherein said clamping unit includes a receiver being disposed on a second end of said pipe, said receiver having a pivot point integrated into an exterior surface of said receiver, said receiver having a well extending into a distal end of said receiver with respect to said second end of said pipe, said pivot point being positioned adjacent to said distal end of said receiver;

wherein said clamping unit includes a handle having a coupled end being pivotally coupled to said pivot point on said exterior surface of said receiver, said handle being compressed against said receiver when said handle is lifted in said pivot point thereby reducing the diameter of said well in said distal end of said receiver, said handle being decompressed from said receiver when said handle is lowered in said pivot point thereby increasing the diameter of said well in said distal end of said receiver; and wherein said extension pipe comprises a reducer having an upper end and a lower end, said upper end having a diameter being greater than a diameter of said lower end, reducer having an elongated annular shape, an interior surface of said reducer being threaded adjacent to said upper end, said lower end being insertable into said well in said distal end of said receiver, said receiver tightening around said reducer when said handle is lifted thereby inhibiting said reducer from being removed from said receiver, said receiver loosening around said reducer when said handle is lowered thereby facilitating said reducer to be removed from said receiver.

10. A pipe holding assembly for precisely locating a pipe for performing joining procedures on the pipe, said assembly comprising:

a base having a screw extending upwardly from said base such that said screw is vertically oriented when said base is positioned on a support surface, said base having a bottom surface, a top surface and a cylinder extending upwardly from said top surface, said cylinder being centrally located on said top surface, said base having a plurality of gussets each extending between said cylinder and said top surface for retaining said cylinder in a perpendicular orientation with said top surface, said screw being attached to and extending away from a distal end of said cylinder, an outer surface of said screw being threaded;

a clamping unit being threadably attachable to said screw such that said clamping unit is vertically oriented when said base is positioned on the support surface, said clamping unit being adjustable upwardly and downwardly on said screw, said clamping unit including a latch being urgeable between a tightening condition and a loosening condition, said clamping unit comprising:

a collar having a skirt and a throat, a bounding surface of said throat being threaded, a bounding surface of said skirt being threaded, said bounding surface of said skirt defining a diameter being less than a diameter defined by said bounding surface of said throat, said outer surface of said screw threadably engaging said bounding surface of said skirt, said collar being adjustable along a full length of said screw;

a pipe having an outside surface being threaded adjacent to a first end of said pipe, said first end being insertable into said throat of said collar having said outside surface threadably engaging said bounding surface of said throat having said screw extending upwardly into said pipe;

a receiver being disposed on a second end of said pipe, said receiver having a pivot point integrated into an exterior surface of said receiver, said receiver having a well extending into a distal end of said receiver with respect to said second end of said pipe, said pivot point being positioned adjacent to said distal end of said receiver; and a handle having a coupled end being pivotally coupled to said pivot point on said exterior surface of said receiver, said handle being compressed against said receiver when said handle is lifted in said pivot point thereby reducing the diameter of said well in said distal end of said receiver, said handle being decompressed from said receiver when said handle is lowered in said pivot point thereby increasing the diameter of said well in said distal end of said receiver;

an extension pipe being insertable into said clamping unit such that said extension pipe is vertically oriented when said base is positioned on the support surface, said extension pipe being secured in said clamping unit when said latch is urged into said tightening condition, said extension pipe being unsecured in said clamping unit when said latch is urged into said loosening condition, said extension pipe having a coupling element, said extension pipe comprising:
- a reducer having an upper end and a lower end, said upper end having a diameter being greater than a diameter of said lower end, reducer having an elongated annular shape, an interior surface of said reducer being threaded adjacent to said upper end, said lower end being insertable into said well in said distal end of said receiver, said receiver tightening around said reducer when said handle is lifted thereby inhibiting said reducer from being removed from said receiver, said receiver loosening around said reducer when said handle is lowered thereby facilitating said reducer to be removed from said receiver;
- a tube having a bottom end, a top end and an exterior surface extending between said bottom end and said top end, said exterior surface being threaded adjacent to said bottom end, said exterior surface threadably engaging said interior surface of said reducer when said bottom end is inserted into said upper end of said reducer; and
- a top mount having a sleeve and a platform lying on a plane being perpendicularly oriented with a longitudinal axis of said sleeve, said sleeve having a lower end being open, said lower end of said sleeve insertably receiving said top end of said tube, said platform having a well extending downwardly into said platform such that said well in said platform defines said coupling element of said extension pipe, said well in said platform being centrally located on said platform, said well having a bounding surface being threaded; and
- a cradle being movably attachable to said coupling element of said extension pipe such that said cradle has an adjustable height with respect to said extension pipe wherein said cradle is configured to be positioned to support a pipe, said cradle including a half pipe and a screw extending downwardly from said half pipe, said screw on said half pipe being aligned with an apex of said half pipe, said screw on said half pipe threadably engaging said bounding surface of said well in said platform thereby facilitating said half pipe to be spaced an adjustable distance over said platform wherein said half pipe is configured to conform to the pipe thereby retaining the pipe at a desired height.

* * * * *